(12) United States Patent
Hamaguchi

(10) Patent No.: US 8,391,386 B2
(45) Date of Patent: Mar. 5, 2013

(54) COMMUNICATION METHOD AND RADIO TRANSMITTER

(75) Inventor: Yasuhiro Hamaguchi, Ichihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/278,437

(22) Filed: Oct. 21, 2011

(65) Prior Publication Data

US 2012/0039408 A1 Feb. 16, 2012

Related U.S. Application Data

(63) Continuation of application No. 11/666,239, filed as application No. PCT/JP2005/019898 on Oct. 28, 2005.

(30) Foreign Application Priority Data

Oct. 29, 2004 (JP) .................................. 2004-317364

(51) Int. Cl.
*H04K 1/10* (2006.01)
*H04L 27/28* (2006.01)

(52) U.S. Cl. ........................................ 375/260; 375/259

(58) Field of Classification Search .................... 375/260
See application file for complete search history.

(56) References Cited

U.S. PATENT DOCUMENTS

| 4,122,415 | A | 10/1978 | Luther, Jr. et al. |
| 5,621,723 | A | 4/1997 | Walton, Jr. et al. |
| 5,857,153 | A | 1/1999 | Lupien |
| 5,995,147 | A | 11/1999 | Suzuki |
| 6,160,791 | A | 12/2000 | Bohnke |
| 6,230,022 | B1 | 5/2001 | Sakoda et al. |
| 6,351,461 | B1 | 2/2002 | Sakoda et al. |
| 6,535,501 | B1 | 3/2003 | Böhnke |
| 6,608,995 | B1 | 8/2003 | Kawasaki et al. |
| 6,741,551 | B1 | 5/2004 | Cherubini |
| 6,747,945 | B2 | 6/2004 | Sudo et al. |
| 6,823,187 | B2 | 11/2004 | Hamabe |

(Continued)

FOREIGN PATENT DOCUMENTS

| EP | 0899923 | 3/1999 |
| EP | 1496632 | 1/2005 |

(Continued)

OTHER PUBLICATIONS

Draft Amendment to Standard [for] Information Technology—Telecommunications and Information Exchange Between System—LAN/MAN Specific Requirements, Part 11: Wireless Medium Access Control (MAC) and Physical Layer (PHY) specifications: Medium Access Control (MAC) Quality of Service (QoS) Enhancements, IEEE P802.11e/D8.0, Feb. 2004 (181 pages).

(Continued)

*Primary Examiner* — Erin File
(74) *Attorney, Agent, or Firm* — Kilpatrick Townsend & Stockton LLP

(57) ABSTRACT

Radio transmission is performed even to a communication party whose bandwidth that can be used for transmission and reception is limited without having an influence of an offset of a DC component. A radio transmitter applied to an OFDMA communication system in which a plurality of different terminals performs communication using OFDM signals at the same time that includes a mapping part that allocates transmission power to each subcarrier, and also selects a subcarrier to which minimum power of the transmission power to be allocated is allocated and modulates transmission data in units of communication slots to output the modulated data; and a transmission part for transmitting radio signals including the modulated data using each of the subcarriers.

35 Claims, 11 Drawing Sheets

U.S. PATENT DOCUMENTS

| | | | |
|---|---|---|---|
| 6,834,079 B1 | 12/2004 | Strait et al. | |
| 6,904,283 B2 | 6/2005 | Li et al. | |
| 6,928,062 B2 | 8/2005 | Krishnan et al. | |
| 6,947,748 B2 | 9/2005 | Li et al. | |
| 6,956,813 B2 | 10/2005 | Fukuda | |
| 7,013,145 B1 | 3/2006 | Centore, III | |
| 7,230,942 B2 | 6/2007 | Laroia et al. | |
| 7,313,124 B2 | 12/2007 | Lim et al. | |
| 7,372,909 B2 | 5/2008 | Miyoshi | |
| 7,382,718 B2 | 6/2008 | Chang et al. | |
| 7,415,074 B2 | 8/2008 | Seto et al. | |
| 7,502,311 B2 | 3/2009 | Song et al. | |
| 7,633,924 B2 | 12/2009 | Fujii et al. | |
| 7,640,373 B2 | 12/2009 | Cudak et al. | |
| 7,688,797 B2 | 3/2010 | Bolinth et al. | |
| 7,760,813 B2 | 7/2010 | Miyoshi | |
| 7,817,729 B2 | 10/2010 | Miyoshi et al. | |
| 7,826,435 B1 | 11/2010 | Wu et al. | |
| 7,860,174 B2* | 12/2010 | Hammerschmidt et al. | 375/260 |
| 7,983,350 B1* | 7/2011 | Dhanoa et al. | 375/260 |
| 8,086,250 B2 | 12/2011 | Janetis et al. | |
| RE43,109 E | 1/2012 | Kowalski et al. | |
| 8,102,831 B2 | 1/2012 | Sudo | |
| 2001/0016499 A1 | 8/2001 | Hamabe | |
| 2002/0015382 A1 | 2/2002 | Fukuda | |
| 2002/0016644 A1 | 2/2002 | Yamada | |
| 2002/0085641 A1* | 7/2002 | Baum | 375/260 |
| 2002/0114270 A1 | 8/2002 | Pierzga et al. | |
| 2002/0193070 A1* | 12/2002 | Kitagawa et al. | 455/17 |
| 2002/0196734 A1 | 12/2002 | Tanaka et al. | |
| 2003/0016731 A1* | 1/2003 | Uesugi | 375/130 |
| 2003/0179776 A1 | 9/2003 | Sumasu et al. | |
| 2003/0193889 A1* | 10/2003 | A. Jacobsen | 370/208 |
| 2003/0224731 A1 | 12/2003 | Yamaura et al. | |
| 2004/0009782 A1 | 1/2004 | Shimizu | |
| 2004/0081123 A1 | 4/2004 | Krishnan et al. | |
| 2004/0135723 A1* | 7/2004 | Nakaya et al. | 342/372 |
| 2004/0146123 A1* | 7/2004 | Lai | 375/329 |
| 2004/0151109 A1 | 8/2004 | Batra et al. | |
| 2004/0203442 A1 | 10/2004 | Krishnan et al. | |
| 2004/0208232 A1 | 10/2004 | Sudo | |
| 2004/0213185 A1 | 10/2004 | Oh et al. | |
| 2004/0264548 A1 | 12/2004 | Miyoshi | |
| 2005/0053164 A1 | 3/2005 | Catreux et al. | |
| 2005/0073973 A1 | 4/2005 | Laroia et al. | |
| 2005/0105589 A1 | 5/2005 | Sung et al. | |
| 2005/0105593 A1* | 5/2005 | Dateki et al. | 375/130 |
| 2005/0111525 A1 | 5/2005 | Driesen et al. | |
| 2005/0128993 A1 | 6/2005 | Yu et al. | |
| 2005/0163238 A1* | 7/2005 | Fujii | 375/260 |
| 2005/0180315 A1* | 8/2005 | Chitrapu et al. | 370/208 |
| 2005/0195328 A1 | 9/2005 | Kim et al. | |
| 2005/0201753 A1 | 9/2005 | Bai | |
| 2005/0213689 A1 | 9/2005 | Matsuda et al. | |
| 2005/0220199 A1 | 10/2005 | Sadowsky et al. | |
| 2005/0265226 A1 | 12/2005 | Shen et al. | |
| 2005/0271026 A1 | 12/2005 | Song et al. | |
| 2005/0271387 A1* | 12/2005 | Kee et al. | 398/140 |
| 2005/0289256 A1 | 12/2005 | Cudak et al. | |
| 2006/0034227 A1* | 2/2006 | Mudulodu et al. | 370/334 |
| 2006/0045192 A1 | 3/2006 | Hayashi | |
| 2006/0088115 A1 | 4/2006 | Chen et al. | |
| 2006/0094363 A1 | 5/2006 | Kang et al. | |
| 2006/0120467 A1 | 6/2006 | Miyoshi et al. | |
| 2006/0160498 A1 | 7/2006 | Sudo | |
| 2006/0234738 A1* | 10/2006 | Costa et al. | 455/502 |
| 2006/0269003 A1* | 11/2006 | Hammerschmidt et al. | 375/260 |
| 2007/0004465 A1 | 1/2007 | Papasakellariou et al. | |
| 2008/0187064 A1 | 8/2008 | Miyoshi | |
| 2009/0052561 A1 | 2/2009 | Baxley et al. | |
| 2009/0060064 A1 | 3/2009 | Futaki et al. | |
| 2009/0129492 A1 | 5/2009 | Hamaguchi et al. | |
| 2009/0161603 A1* | 6/2009 | Cheng et al. | 370/328 |
| 2010/0309046 A1 | 12/2010 | Flippo et al. | |
| 2010/0311388 A1 | 12/2010 | Flippo et al. | |
| 2011/0004751 A1 | 1/2011 | Wang | |
| 2011/0026615 A1 | 2/2011 | Miyoshi et al. | |
| 2011/0058626 A1 | 3/2011 | Balakrishnan et al. | |
| 2011/0076984 A1 | 3/2011 | Flippo et al. | |
| 2011/0222504 A1* | 9/2011 | Ma et al. | 370/330 |
| 2012/0033753 A1 | 2/2012 | Hamaguchi | |
| 2012/0082254 A1 | 4/2012 | Kashiwagi et al. | |
| 2012/0113923 A1 | 5/2012 | Kashiwagi et al. | |
| 2012/0113924 A1 | 5/2012 | Kashiwagi et al. | |

FOREIGN PATENT DOCUMENTS

| | | |
|---|---|---|
| EP | 1496832 | 1/2005 |
| JP | 1127231 | 5/1989 |
| JP | 09205411 | 8/1997 |
| JP | 10-66039 | 3/1998 |
| JP | 10276165 | 10/1998 |
| JP | 11-8604 | 1/1999 |
| JP | 11025276 | 1/1999 |
| JP | 11154925 | 6/1999 |
| JP | 11196043 | 7/1999 |
| JP | 11205276 | 7/1999 |
| JP | 11346203 | 12/1999 |
| JP | 2000013310 | 1/2000 |
| JP | 2000354266 | 12/2000 |
| JP | 2001238251 | 8/2001 |
| JP | 2001313628 | 11/2001 |
| JP | 2001359152 | 12/2001 |
| JP | 2003101499 | 4/2003 |
| JP | 2003169036 | 6/2003 |
| JP | 2003259448 | 9/2003 |
| JP | 2003309533 | 10/2003 |
| JP | 2003333008 | 11/2003 |
| JP | 2004-214857 A | 7/2004 |
| JP | 2004187257 | 7/2004 |
| JP | 2004241804 | 8/2004 |
| JP | 2004260692 | 9/2004 |
| JP | 2005006115 | 1/2005 |
| JP | 2005160079 | 6/2005 |
| JP | 4302761 | 7/2009 |
| JP | 4347410 | 10/2009 |
| JP | 4382144 | 12/2009 |
| JP | 4384710 | 12/2009 |
| WO | 04/002011 | 12/2003 |
| WO | 2004040813 | 5/2004 |
| WO | 2004040827 | 5/2004 |
| WO | 2004095851 | 11/2004 |
| WO | 2004098072 | 11/2004 |
| WO | 2004114564 | 12/2004 |
| WO | 2005060108 | 6/2005 |
| WO | 2005101780 | 10/2005 |
| WO | 2006107037 | 10/2006 |

OTHER PUBLICATIONS

"Information technology—Telecommunications and information exchange between systems—Local and Metropolitan area networks—Specific Requirements", Part 11: Wireless LAN Medium Access Control (MAC) and Physical Layer (PHY) specifications. IEEE Std 802-11-1997, Jun. 26, 1997 (466 pages).

"System Description and Operating Principles for High Throughput Enhancements to 802.11", Qualcomm, IEEE 802.11-04/0870r3, Feb. 2004.

"WWiSE Proposal: High throughput extension to the 802.11 Standard", Broadcom, TI, STMicroelectronics, Airgo et al., IEEE 802.11-040886r6, Jan. 6, 2005.

Harada, et al., "Dynamic Parameter Controlled OFITDMA High-mobility Broadband Wireless Access System by Dynamic Parameter Controlled OF/TDMA", IEICE General Conference, B-5-64, 2004, p. 551.

Koshimizu, et al., "A Study on Interference Estimation Method for Adaptive modulation of Downlink DPC-OF/TDMA", Technical Report of the IEICE RCS2004-85, Jun. 2004, pp. 55-60.

Samsung CQI, "Report and Scheduling Procedure, 3GPP TSG-RAN WG1 Meeting, #42bis Tdoc, R1-051045", Oct. 10, 2005, pp. 1-4.

U.S. Appl. No. 11/795,408, Office Action mailed Jan. 4, 2011.
U.S. Appl. No. 11/795,408, Final Office Action mailed Oct. 18, 2011.
U.S. Appl. No. 11/666,239, Office Action mailed Nov. 19, 2009.
U.S. Appl. No. 11/666,239, Final Office Action mailed Jun. 11, 2010.
U.S. Appl. No. 11/666,239, Advisory Action mailed Sep. 23, 2011.

U.S. Appl. No. 11/666,239, Suppl. Advisory Action mailed Sep. 30, 2011.

U.S. Appl. No. 13/271,936, Non-Final Office Action, mailed Dec. 14, 2011 (13 pages).

Gomi, Hidekazu et al., "Fundamental Performance Evaluation of Dynamic Parameter Controlled OF/TDMA Based on PR-DSMA", *Technical Report of IEICE*, Nov. 12, 2004, RCS2004-223, pp. 1-6.

Harada, Hiroshi et al., "New Generation Mobile Communication System by Dynamic Parameter Controlled OF/TDMA", *Technical Report of IEICE*, Jan. 9, 2004, RCS2003-284, pp. 41-46.

U.S. Appl. No. 11/666,239, Non-Final Office Action mailed Apr. 27, 2012 (9 pages).

U.S. Appl. No. 13/272,048, Non-Final Office Action mailed Feb. 2, 2012 (7 pages).

U.S. Appl. No. 13/337,809, Non-Final Office Action mailed Feb. 24, 2012 (14 pages).

Batra, Anuj, et al. (Texas Instruments et al.), "Multi-band OFDM Physical Layer Proposal for IEEE 802.15 Task Group 3a; 03268r3P802-15_TG3a-Multi-band-CFP-Document", IEEE Draft; 03268R3P802-15_TG3A-Multi-Band-CFP-Document, Mar. 1, 2004, pp. 1-65, vol. 802.15, IEEE-SA, Piscataway, NJ.

European Patent Application No. 05799403.0, Extended European Search Report mailed May 29, 2012 (9 pages).

U.S. Appl. No. 13/271,936, Notice of Allowance mailed Jul. 27, 2012 (15 pages).

U.S. Appl. No. 11/666,239, Final Office Action mailed Dec. 5, 2012 (9 pages).

\* cited by examiner

| TIME SLOT | T1 | T2 | T3 | T4 | T5 | T6 | T7 | T8 | T9 |
|---|---|---|---|---|---|---|---|---|---|
| UNUSED SUB-CARRIER NUMBER | 32xp | -193<br>-1<br>96<br>192<br>352<br>384 | -64<br>352<br>384 | -1<br>-193<br>256<br>320<br>352<br>384 | -193<br>-1<br>96<br>192<br>256<br>320<br>352<br>384 | 96<br>192<br>352<br>384 | NONE | NONE | NONE |

NOTE : f(0), f(385), TO f(511), AND f(-385) TO f(-512) ARE NOT USED ALWAYS.

FIG. 3

COMMUNICATION METHOD AND RADIO TRANSMITTER

CROSS-REFERENCE TO RELATED APPLICATIONS

This application is a continuation of U.S. patent application Ser. No. 11/666,239 having a §371(c) filing date of Apr. 25, 2007, pending, which is a national phase of International Application No. PCT/JP2005/019898 filed on Oct. 28, 2005, which claims priority to Japanese Patent Application No. 2004-317364 filed on Oct. 29, 2004, all of which are incorporated herein by reference.

TECHNICAL FIELD

The present invention relates to a communication method and a radio transmitter that perform radio transmission with a multi-carrier transmission system using communication slots.

BACKGROUND ART

In recent years, standardization for realizing broadband wireless Internet access targeting a transmission rate of 10 Mbps to 100 Mbps has been promoted and various kinds of technologies have been proposed. A requirement needed for realizing high speed transmission rate radio communication is to increase frequency utilization efficiency. Since the transmission rate and a bandwidth used are in a direct proportional relationship, a simple solution to increase the transmission rate is to broaden the frequency bandwidth to be used. However, frequency bands that can be used are becoming scarcer and it is therefore unlikely that sufficient bandwidth be assigned for constructing a new radio communication system. Consequently, it becomes necessary to increase frequency utilization efficiency. In addition, another requirement is to seamlessly provide services in a private area (isolated cell) such as a wireless LAN while realizing services in a communication area composed of cells such as mobile phones.

A technology that has a potential for meeting these requirements includes one-cell repetition OFDMA (Orthogonal Frequency Division Multiple Access). In this technology, communication is performed by using the same frequency band in all cells in a communication area composed of these cells, and a modulation system for performing communication is OFDM. This communication method can realize faster data communication while isolated cells have a radio interface common to that of a cell area as a matter of course.

An essential technology OFDM of the OFDMA will be described below. The OFDM system is used in IEEE802.11a, which is a 5 GHz-band radio system, and Digital Terrestrial Broadcasting. The OFDM system arranges several tens to several thousands of carriers at theoretically minimum frequency intervals with no interference for simultaneous communications. In the OFDM, these carriers are usually called subcarriers and each subcarrier is modulated by a digital system such as PSK (phase shift modulation) and QAM (quadrature amplitude modulation) for communication. Further, the OFDM is said to be a frequency-selective fading resistant modulation system in combination with an error correction system.

A circuit configuration for modulation and demodulation will be described using diagrams. Here, it is assumed that 768 subcarriers are used for the OFDM for a concrete description below.

FIG. 6 is a block diagram illustrating a schematic configuration of a modulation circuit of the OFDM. The modulation circuit shown in FIG. 6 includes an error correction coding part 501, a serial to parallel conversion part (S/P conversion part) 502, a mapping part 503, an IFFT part 504, a parallel to serial part (P/S conversion part) 505, a guard interval insertion part 506, a digital to analog conversion part (D/A conversion part) 507, a radio transmission part 508, and an antenna 509. Error correction encoding of information data to be transmitted is performed by the error correction coding part 501. If a modulation scheme of each carrier is QPSK (four-phase modulation), 2.times.768=1536 bits are output from an error correction coding circuit to generate one OFDM symbol. Then, 2 bits are input into the mapping part 503 at a time from the S/P conversion part 502 as 768-system data, and modulation is performed by the mapping part 503 for each carrier. Then, the IFFT part 504 performs IFFT (Inverse Fast Fourier Transform). The number of points of the IFFT usually used for generating a 768-subcarrier OFDM signal is 1024.

Data is allocated to f(n) (n is an integer between 0 and 1023) by the mapping part and thus the IFFT part 504 will output data t(n). Since only 768 pieces of data are input for 1024-point IFFT input in the present example, zero (both real and imaginary parts) is input as other pieces of data. Normally, f(0) and f(385) to f(639) correspond to input of zero. Then, after the data is converted to serial data by the P/S conversion part 505, guard intervals are inserted by the guard interval insertion part 506. Guard intervals are inserted for reducing interference between symbols when receiving an OFDM signal. If no guard interval is used, IFFT output t(n) is output in order of t(0), t(1), . . . , t(1023) and these form symbols of the OFDM. When guard intervals are used, a latter half part of IFFT output will be output in accordance with a guard interval length. If the guard interval length is ⅛ of a normal OFDM symbol, t(n) will be output in order of t(896), t(897), . . . , t(1023), t(0), t(1), . . . , t(1023). Then, after the data is converted to an analog signal by the D/A conversion part 507, the analog signal is converted to a frequency to be used for transmission, and then the data is transmitted from the antenna 509.

FIG. 7 illustrates a schematic view of spectrum of an OFDM signal after D/A conversion, a schematic view of time waveforms after D/A conversion, and a schematic view after frequency conversion of the spectrum to a transmission band. f(n) and t(n) in FIG. 7 are the same as those shown in the above description.

It is known that if, usually when transmitting or receiving an OFDM signal, the center of all bands is handled as DC in base-band processing, a sampling frequency of an A/D converter and D/A converter will be the smallest and also efficient. However, in the OFDM, as shown above, no data is usually allocated to a DC component, that is, a carrier corresponding to f(0). Thus, power of the DC component is also depicted as zero in FIG. 7. It is obviously theoretically possible to modulate the DC component, but the DC component is susceptible to noise (an influence of offset in the DC component of a circuit) in a transmitter or receiver and thus degradation of characteristics thereof is severe compared with other subcarriers. For this reason, almost all systems do not modulate the subcarrier of the DC component.

Japanese Patent Application Laid-Open No. Hei 10-276165 and Japanese Patent Application Laid-Open No. Hei 11-154925, for example, describe an influence of the DC offset and how to eliminate the DC offset.

FIG. 8 is a block diagram illustrating the schematic configuration of an OFDM demodulator circuit. Basically, an operation that is opposite to that performed by a transmission part is performed by a reception part. The demodulator circuit shown in FIG. 8 includes an error correction decoding part 701, a parallel to serial conversion part (P/S conversion part) 702, a propagation path estimation demapping part 703, an FFT part 704, a serial to parallel (S/P conversion part) 705, a guard interval (GI) removal part 706, an OFDM symbol synchronization part 707, an analog to digital conversion part (A/D conversion part) 708, a radio reception part 709, and an antenna 710. Frequencies of radio waves received by the antenna part 710 are converted down to frequency bands where A/D conversion can be performed by the radio reception part 709.

OFDM symbol synchronization of data converted to a digital signal by the A/D conversion part 708 is carried out by the OFDM symbol synchronization part 707. Symbol synchronization is to determine boundaries of OFDM symbols from continuously incoming data. Data whose symbol synchronization has been carried out is represented by t'(n). If there is neither multipath nor noise in communication at all, t'(n)=t(n) holds. Guard intervals are removed by the guard interval removal part 706. Therefore, after guard intervals are removed, t'(m) (m is an integer between 0 and 1023) will be extracted. Then, parallel conversion of the data into 1024 pieces of data is performed by the S/P conversion part 705. Then, 1024-point FFT (Fast Fourier Transform) is performed by the FFT part 704 before f'(m) is output to the propagation path estimation demapping part 703. However, since no modulation has been performed for m=0 and m=385 to 639 for transmission, f'(m) corresponding to such m are not input into the demapping part. Demodulation of subcarriers including propagation path estimation of 768 subcarriers is performed by the propagation path estimation demapping part 703. The data is converted to serial data by the P/S conversion part 702 and error corrections are carried out by the error correction decoding part 701 before demodulation of transmission data is completed.

Next, the OFDMA will be described based on the above OFDM. The OFDMA system forms two-dimensional channels on frequency and time axes, arranges slots for communication two-dimensionally in a frame, and allows a mobile station to access a base station using the slots. FIG. 9 is a diagram illustrating a two-dimensional frame configuration of the OFDMA. In this diagram, the vertical axis is the frequency axis and the horizontal axis is the time axis. One rectangle is a slot used for data transmission and a rectangle with oblique lines is a control slot used by the base station to transmit broadcast information to all mobile stations. This diagram indicates that one frame has nine slots in a time direction and twelve slots in a frequency direction, and 108 slots (among 108 slots, twelve slots are control slots) exist in total. Formally, a slot is represented by (Ta, Fb), with a time axis direction slot Ta (a is a natural number between 1 and 9) and a frequency axis direction slot Fb (b is a natural number between 1 and 12). A shaded slot in FIG. 9, for example, is represented by (T4, F7).

In the present specification, twelve slots configured in the frequency direction are called time channels and nine slots configured in the time direction are called frequency channels or sub-channels.

Subcarriers of the OFDM will be divided and allocated to the frequency channels. Since it is assumed that the OFDM has 768 subcarriers, 64 subcarriers are allocated to each channel if divided equally among twelve slots. Here, it is assumed that subcarriers are allocated in increasing order of spectrum in bands used for actual communication for convenience and thus subcarriers f640 to f703 are allocated to F1, subcarriers f704 to f767 to F2, . . . , subcarriers f960 to f1023 to F6, subcarriers f1 to f64 to F7, subcarriers f65 to f128 to F8, . . . , and subcarriers f321 to f384 to F12.

Communication from a base station (AP) to a mobile station (MT) will be considered. Many cases can be considered when the AP allocates data for 15 slots to the MT and it is assumed here that data is allocated to slots with vertical lines in FIG. 9. That is, data to be received by the MT will be allocated to (T2 to T4, F1), (T5 to T8, F4), and (T2 to T9, F11). It is also necessary to embed data indicating allocation of data in a control slot corresponding to the frequency to be used to indicate that the AP has allocated data to the MT. For the present example, (T1, F1), (T1, F4), and (T1, F11) correspond to such control slots.

The OFDMA system, based on what has been described above, allows a plurality of mobile stations to transmit and receive data to and from the base station by changing the frequencies and times. FIG. 9 illustrates a gap between slots for convenience, but whether or not there is a gap is not so important.

FIG. 10 is a block diagram illustrating a schematic configuration of a radio transmitter used for the OFDMA, and FIG. 11 is a block diagram illustrating the schematic configuration of a receiving circuit used for the OFDMA. A transmitting circuit shown in FIG. 10 has a data multiplexing part 901, and is divided into an error correction coding part 902, an S/P conversion part 903, and a mapping part 904 for the number of channels (one to twelve). An IFFT part 905, a P/S conversion part 906, a GI insertion part 907, a D/A conversion part 908, a radio transmission part 909, and an antenna 910 fulfill functions similar to those of the IFFT part 504, parallel to serial conversion part (P/S conversion part) 505, guard interval insertion part 506, digital to analog conversion part (D/A conversion part) 507, radio transmission part 508, and antenna 509 shown in FIG. 6 respectively.

In FIG. 10, the data multiplexing part 901 demultiplexes information data to be transmitted into twelve series in units of packets. That is, the multiplexer 901 physically specifies slots of the OFDMA specified by modules such as CPU (not shown). Then, error correction encoding is performed by the as many error correction coding parts 902 as the channels, the data is demultiplexed into 64-system data by the as many S/P conversion parts 903 as the channels, and modulation is performed by the as many mapping parts 904 as the channels for each carrier before IFFT processing is performed by the IFFT part 905. Operations thereafter are the same as those described with reference to FIG. 6.

A receiving circuit shown in FIG. 11 has a data multiplexing part 101, and is divided into an error correction coding part 102, a parallel to serial conversion part (P/S conversion part) 103, and a propagation path estimation demapping part 104 for the number of channels (one to twelve). An FFT part 106, a GI removal part 107, a synchronization part 108, an A/D conversion part 109, a radio receiving part 110, and an antenna part 111 fulfill functions similar to those of the FFT part 704, serial to parallel conversion part (S/P conversion part) 705, guard interval (GI) removal part 706, OFDM symbol synchronization part 707, analog to digital conversion part (A/D conversion part) 708, radio reception part 709, and antenna 710. Similar to the receiving circuit shown in FIG. 8, FFT processing is performed for received radio waves, and each of the twelve series of data undergoes propagation path estimation, demapping, and error correction processing before being input into the data multiplexing part 101. Information data is processed by the data multiplexing part 101 before being output.

Modulation and demodulation processing shown here is only an example. Particularly, as many blocks as the number of channels, that is, twelve blocks are shown, but the present invention is not limited to this number. Japanese Patent Application Laid-Open No. Hei 11-346203 described a basic configuration of an OFDMA transmission apparatus.
Japanese Patent Application Laid-Open No. 10-276165
Japanese Patent Application Laid-Open No. 11-154925
Japanese Patent Application Laid-Open No. 11-346203

BRIEF DESCRIPTION OF THE DRAWINGS

FIG. 3 is a diagram illustrating unused subcarrier numbers in each time slot.

DETAILED DESCRIPTION OF THE INVENTION

When the OFDMA is used for communication, terminals with various capabilities may be connected as a mobile station. One of such terminals is a low power consumption terminal. This type of terminal is constructed so as to reduce power consumption to be more suitable for portability even at the expense of a certain amount of transmission and reception capabilities. A method that may reduce power consumption of an OFDMA terminal is to narrow bandwidths that are capable of transmitting and receiving radio waves to limit accessible frequency channels. Limiting accessible frequency channels has disadvantages such as a reduced transmission rate and not being able to select channels in good propagation condition, but also has advantages such as being able to lessen a processing speed, for example, a sampling frequency of an A/D converter and the processing speed of logic, and as a result, lower power consumption can be achieved.

Figure 9:
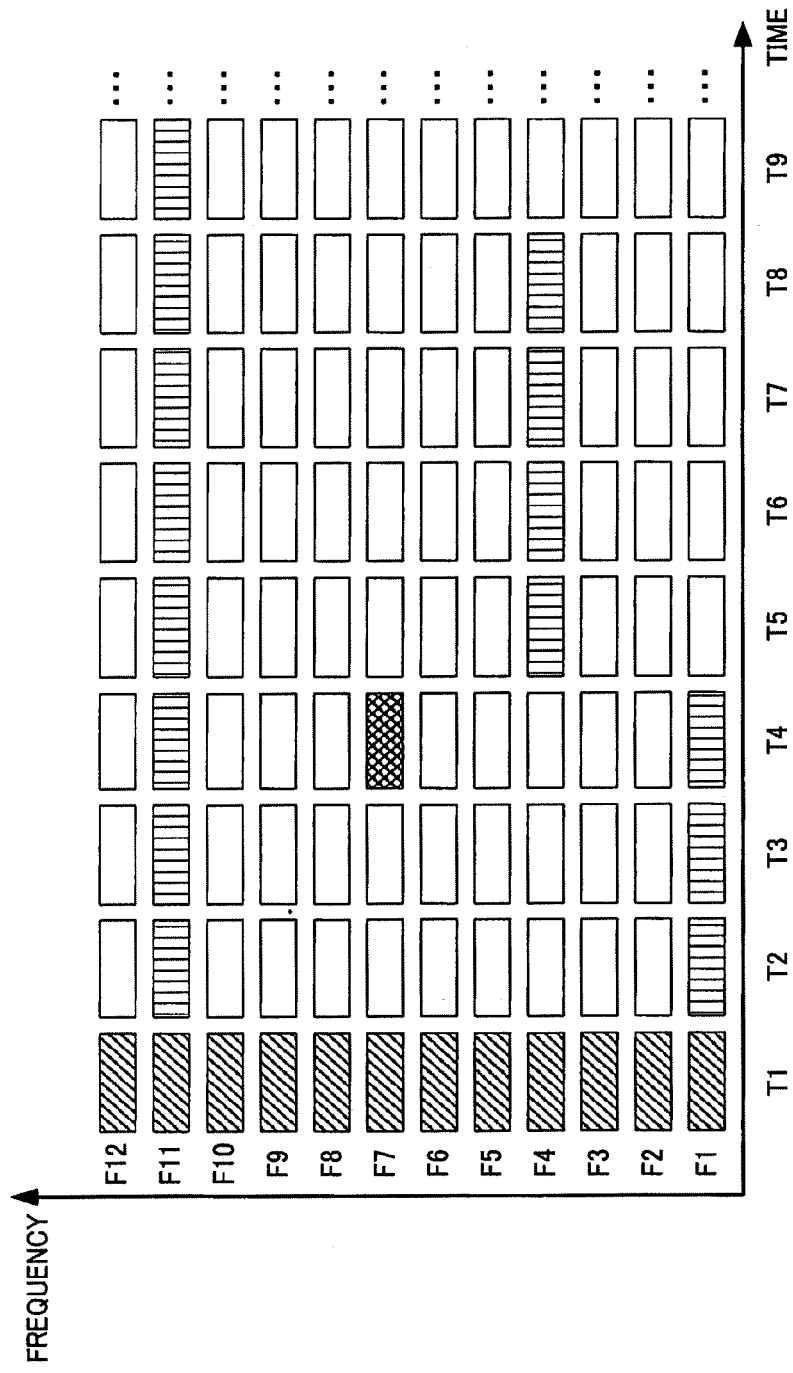
FIG. 9 is a diagram illustrating a two-dimensional frame configuration of a conventional OFDMA.
Figure 10:
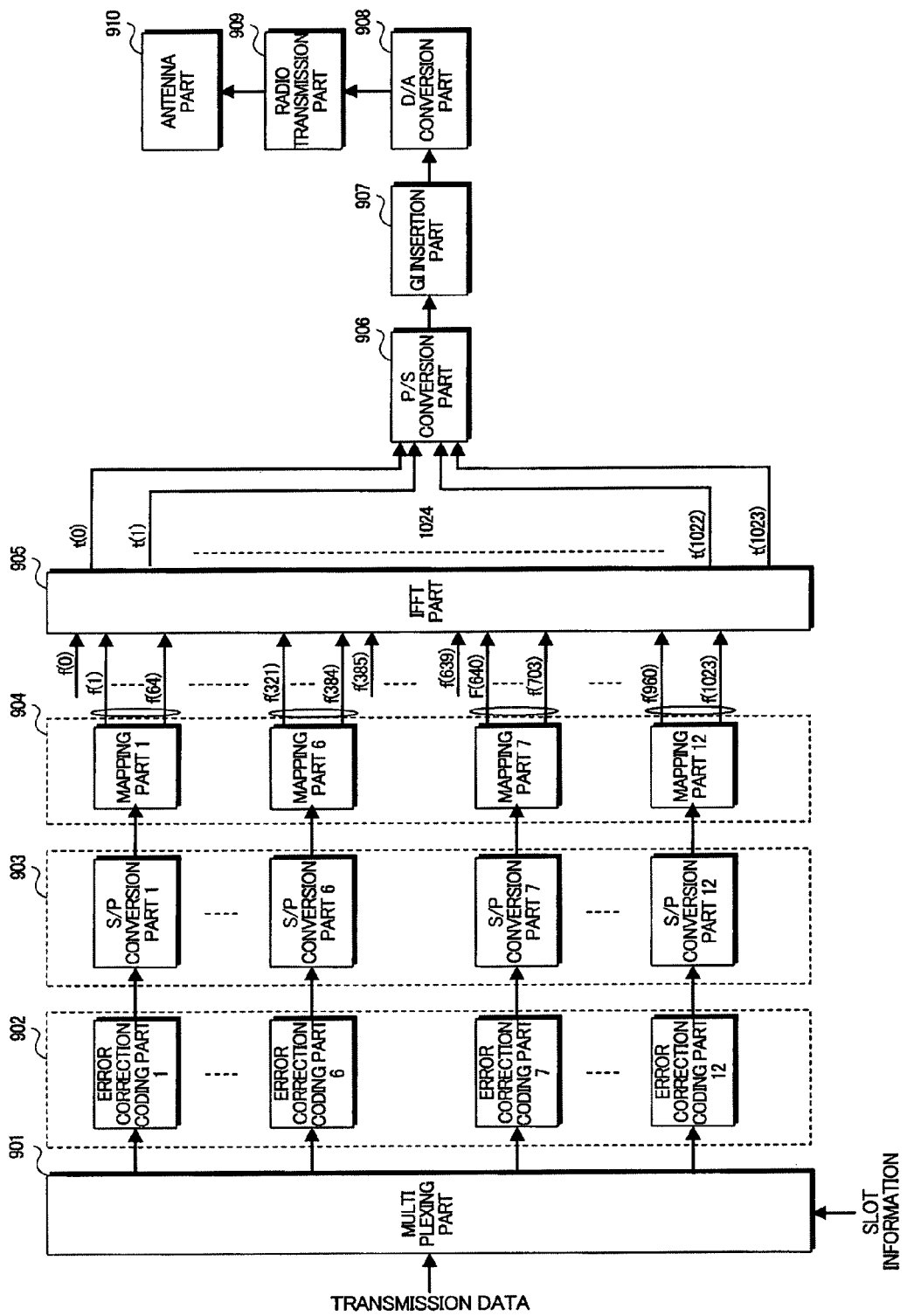
FIG. 10 is a block diagram illustrating the schematic configuration of a transmitting circuit used for the conventional OFDMA.
Figure 11:
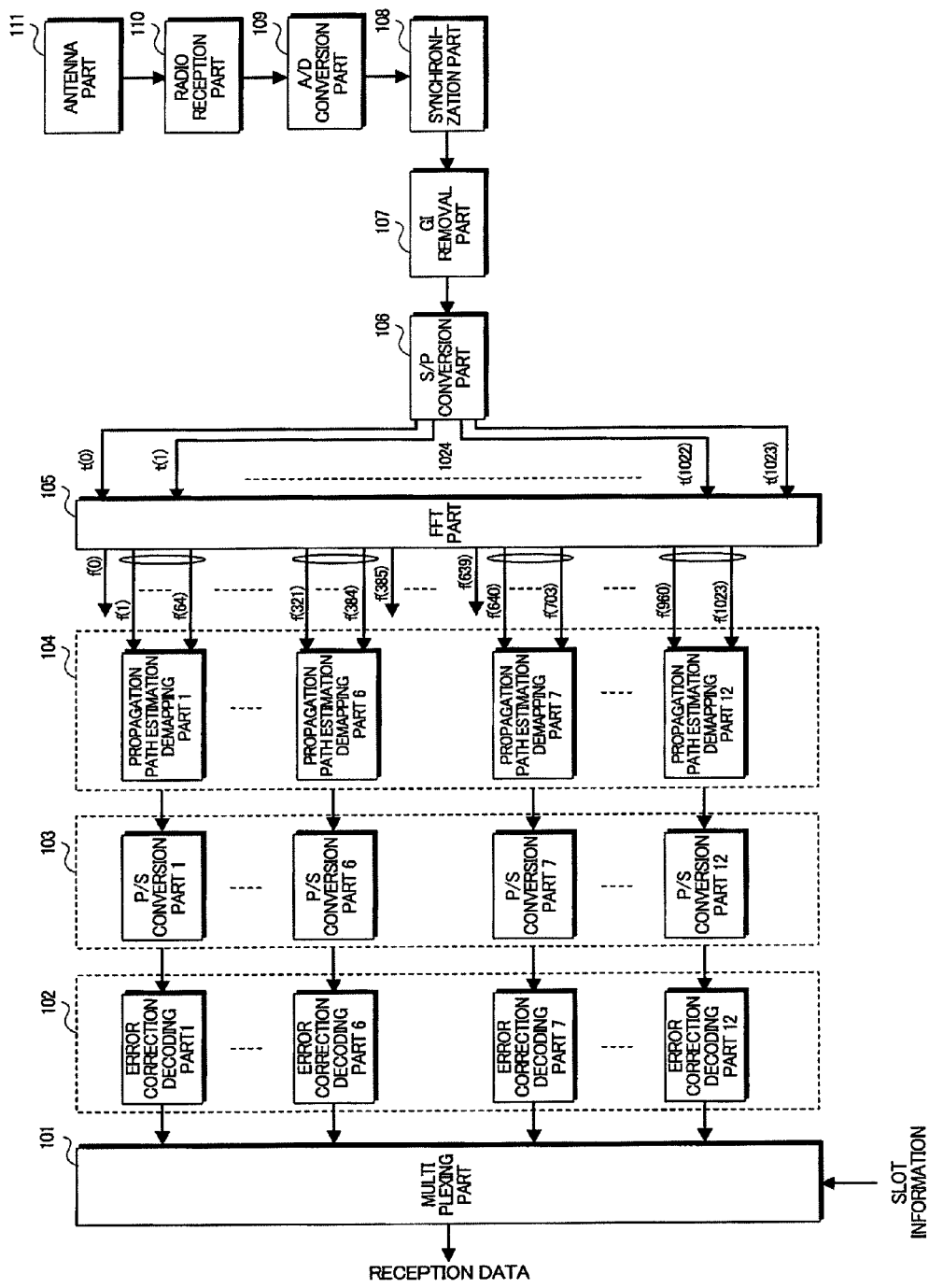
FIG. 11 is a block diagram illustrating the schematic configuration of a receiving circuit used for the conventional OFDMA.

Conventional OFDMA transmitters and receivers assume that, as described above, a receiving terminal receives and processes all bands. Thus, a transmitter adopts a system in which a subcarrier of a DC component (f(0)), being a center of all bands, is not used. The case where a terminal capable of receiving only one band in a state described above makes access will be discussed. Such a terminal filters a band to be received using an analog filter. If, for example, only the slot of F2 (subcarrier numbers f(704) to f(767)) in FIG. 9 should be received, F2 is extracted by filtering and the center of this band, f(735) or f(736), will be handled as a center frequency. Incidentally, selection of f(735) and f(736) shown here has no special meaning.

Since modulation has conventionally been performed for such subcarriers like other subcarriers in a transmitter, a receiving terminal must demodulate such subcarriers despite bad characteristics. Thus, there have been problems such as degraded characteristics, an occurrence of errors in receiving slots, and an occurrence of retransmission, leading to reduced throughput of an overall system. Such problems are not limited to the terminal capable of receiving only one band, as described above, and concern various terminals, for example, those terminals capable of receiving only two bands.

The present invention has been made in view of circumstances described above and an object thereof is to provide a radio transmitter capable of performing radio transmission without having an influence of an offset of a DC component even to a communication party whose bandwidth that can be used for transmission and reception is limited.

(1) To achieve the above object, the present invention has taken steps shown below. That is, a communication method according to the present invention is a communication method in which a plurality of different terminals performs communication using OFDM signals at the same time, wherein a transmitting terminal allocates minimum transmission power for transmission to a specific subcarrier mutually known between the transmitting terminal and a receiving terminal within a communication slot, which is a frequency band in units of access, and the receiving terminal performs frequency conversion of a received signal assuming that a frequency of the specific subcarrier corresponds to a direct current potential and converts the frequency-converted received signal to a digital signal by using an analog to digital converter for data demodulation.

Thus, the minimum transmission power is allocated for transmission to a specific subcarrier mutually known between the transmitting terminal and receiving terminal within a communication slot, which is a frequency band in units of access, and therefore, radio transmission can be performed without causing any influence of offset by a DC component regardless of which bandwidth a communication party uses. Accordingly, it becomes possible to prevent deterioration of communication characteristics and occurrence of errors in receiving slots to avoid degradation of throughput because the DC component will not exert any influence upon transmission and reception processing even if communication is performed with a terminal whose bandwidth in use is limited in order to reduce power consumption.

(2) Also, a communication method according to the present invention is a communication method in which a plurality of different terminals performs communication using OFDM signals at the same time, wherein a receiving terminal performs frequency conversion of a received signal and notifies a transmitting terminal of information about whether or not a frequency of a subcarrier corresponding to a direct current potential about the received signal which was inputted to an analog to digital converter can be used for data communication, and the transmitting terminal allocates, when the notified information indicates that the frequency of the subcarrier corresponding to the direct current potential cannot be used for data communication, minimum transmission power to the subcarrier for transmission.

If information notified from the receiving terminal indicates that the frequency of the subcarrier corresponding to the direct current potential cannot be used for data communication, the transmitting terminal allocates the minimum transmission power to the subcarrier, as described above, and therefore, radio transmission can be performed without causing any influence of offset by a DC component at the receiving terminal. Accordingly, it becomes possible to prevent deterioration of communication characteristics and occurrence of errors in receiving slots to avoid degradation of throughput because the DC component will not exert any influence upon transmission and reception processing even if communication is performed with a terminal whose bandwidth in use is limited in order to reduce power consumption.

(3) Also, a communication method according to the present invention is a communication method in which a plurality of different terminals performs communication using OFDM signals at the same time, wherein a receiving terminal performs frequency conversion of a received signal and notifies a transmitting terminal of information about whether or not a frequency of a subcarrier corresponding to a direct current potential about the received signal which was inputted to an analog to digital converter can be used for data communication, and the transmitting terminal allocates minimum transmission power to a subcarrier of the notified frequency for transmission.

Thus, the transmitting terminal allocates the minimum transmission power for transmission to the subcarrier of the frequency notified from the receiving terminal, and therefore, radio transmission can be performed without causing any influence of offset by a DC component at the receiving terminal. Accordingly, it becomes possible to prevent deterioration of communication characteristics and occurrence of errors in receiving slots to avoid degradation of throughput because the DC component will not exert any influence upon transmission/reception processing even if communication is performed with a terminal whose bandwidth in use is limited in order to reduce power consumption.

(4) Also, the communication method according to the present invention is characterized in that the minimum transmission power is zero.

Thus, the minimum transmission power is zero, and therefore, radio transmission can be performed without causing any influence of offset by a DC component. Accordingly, it becomes possible to prevent deterioration of communication characteristics and occurrence of errors in receiving slots to avoid degradation of throughput because the DC component will not exert any influence upon transmission/reception processing even if communication is performed with a terminal whose bandwidth in use is limited in order to reduce power consumption.

(5) Also, the communication method according to the present invention is characterized in that the specific subcarrier mutually known between the transmitting terminal and receiving terminal is a center frequency of the communication slot.

Thus, the known specific subcarrier is the center frequency of the communication slot, and therefore, an influence of offset by a DC component can be avoided by allocation of the center frequency of the communication slot to the DC component in reception processing by the receiving terminal. Accordingly, it becomes possible to prevent deterioration of communication characteristics and occurrence of errors in receiving slots to avoid degradation of throughput because the DC component will not exert any influence upon transmission/reception processing even if communication is performed with a terminal whose bandwidth in use is limited in order to reduce power consumption.

(6) Also, the communication method according to the present invention is characterized in that the specific subcarrier mutually known between the transmitting terminal and receiving terminal is one of a maximum frequency and a minimum frequency of the communication slot.

Thus, the known specific subcarrier is one of the maximum frequency and minimum frequency of the communication slot, and therefore, it becomes possible to easily determine the subcarrier to be a DC component or the subcarrier corresponding to the center frequency in bandwidths used by the receiving terminal. That is, if there are even subcarriers included in the communication slot, the subcarrier corresponding to the center frequency can be determined by making the number of subcarriers odd after excluding (allocating no modulated data to) the subcarrier corresponding to the maximum frequency or minimum frequency. Since it is sill possible to allocate no modulated data to the subcarrier to be a DC component or the subcarrier corresponding to the center frequency even if a plurality of frequency channels is used by excluding (allocating no modulated data to) the subcarrier corresponding to the maximum frequency or minimum frequency, radio transmission can be performed without causing any influence of offset by a DC component regardless of which bandwidth a communication party uses. Also, a terminal that can receive only one sub-channel filters the one sub-channel to perform reception processing. Since in this case no modulation of subcarrier in the center of each sub-channel has been performed, data can be demodulated without deterioration of characteristics by ignoring the center for demodulation like a convention OFDM receiver. Similarly, since the center frequency of a terminal that can access only x (x is an odd number) sub-channels will be the center of a sub-channel under the current assumption and the subcarrier thereof is not used for modulation, data can be demodulated without deterioration of characteristics by ignoring the center for demodulation like the conventional OFDM receiver. The center of a terminal that can access only y (y is an even number) sub-channels will be between sub-channels. Since also a subcarrier between sub-channels is not used for modulation, similar to the convention OFDM receiver, data can be demodulated without deterioration of characteristics by ignoring the center for demodulation. Thus, it becomes possible to prevent deterioration of communication characteristics and occurrence of errors in receiving slots to avoid degradation of throughput.

(7) Also, the communication method according to the present invention is characterized in that the transmitting terminal does not allocate information data to a subcarrier to which the minimum transmission power is allocated.

Since no information data is allocated to the subcarrier to which the minimum transmission power is allocated, it becomes possible to prevent deterioration of communication characteristics and occurrence of errors in receiving slots to avoid degradation of throughput.

(8) Also, a radio transmitter according to the present invention is a radio transmitter applied to an OFDMA communication system in which a plurality of different terminals performs communication using OFDM signals at the same time, the transmitter comprises: a mapping part that allocates transmission power to each subcarrier, and also selects a subcarrier to which minimum power of the transmission power to be allocated is allocated, and modulates transmission data in units of communication slots to output the modulated data; and a transmission part for transmitting radio signals including the modulated data using each of the subcarriers.

Thus, the subcarrier to which the minimum transmission power of transmission power to be allocated is selected, and therefore, it becomes possible to select a specific subcarrier known between a transmitting terminal and a receiving terminal, select a subcarrier that cannot be used for data communication, and a subcarrier notified from the receiving terminal. As a result, radio transmission can be performed without causing any influence of offset by a DC component regardless of which bandwidth a communication party uses. Accordingly, it becomes possible to prevent deterioration of communication characteristics and occurrence of errors in receiving slots to avoid degradation of throughput because the DC component will not exert any influence upon transmission and reception processing even if communication is performed with a terminal whose bandwidth in use is limited in order to reduce power consumption.

(9) Also, the radio transmitter according to the present invention is characterized in that the mapping part allocates zero to the selected subcarrier as the transmission power.

Thus, zero is allocated to the selected subcarrier as transmission power, and therefore, radio transmission can be performed without causing any influence of offset by a DC component. Accordingly, it becomes possible to prevent deterioration of communication characteristics and occurrence of errors in receiving slots to avoid degradation of throughput because the DC component will not exert any influence upon transmission/reception processing even if communication is performed with a terminal whose bandwidth in use is limited in order to reduce power consumption.

(10) Also, the radio transmitter according to the present invention is characterized in that the mapping part selects a subcarrier corresponding to a center of a communication slot.

Thus, the subcarrier corresponding to the center of the communication slot is selected, and therefore, an influence of offset by a DC component can be avoided by allocation of the center frequency of the communication slot to the DC component in reception processing by the receiving terminal. Accordingly, it becomes possible to prevent deterioration of communication characteristics and occurrence of errors in receiving slots to avoid degradation of throughput because the DC component will not exert any influence upon transmission and reception processing even if communication is performed with a terminal whose bandwidth in use is limited in order to reduce power consumption.

(11) Also, the radio transmitter according to the present invention is characterized in that the mapping part selects a subcarrier corresponding to a maximum frequency or a minimum frequency of a communication slot.

Thus, the subcarrier corresponding to the maximum frequency or minimum frequency of the communication slot, and therefore, it becomes possible to easily determine the subcarrier to be a DC component or the subcarrier corresponding to the center frequency in bandwidths used by the receiving terminal. That is, if there are even subcarriers included in the communication slot, the subcarrier corresponding to the center frequency can be determined by making the number of subcarriers odd after excluding (allocating no modulated data to) the subcarrier corresponding to the maximum frequency or minimum frequency. Since it is sill possible to allocate no modulated data to the subcarrier to be a DC component or the subcarrier corresponding to the center frequency even if a plurality of frequency channels is used by excluding (allocating no modulated data to) the subcarrier corresponding to the maximum frequency or minimum frequency, radio transmission can be performed without causing any influence of offset by a DC component regardless of which bandwidth a communication party uses. Also, a terminal that can receive only one sub-channel to perform reception processing. Since in this case no modulation of subcarrier in the center of each sub-channel has been performed, data can be demodulated without deterioration of characteristics by ignoring the center for demodulation like a conventional OFDM receiver. Similarly, since the center frequency of a terminal that can access only x (x is an odd number) sub-channels will be the center of a sub-channel under the current assumption and the subcarrier thereof is not used for modulation, data can be demodulated like the conventional OFDM receiver. The center of a terminal that can access only y (y is an even number) sub-channels will be between sub-channels. Since also a subcarrier between sub-channels is not used for modulation, similar to the conventional OFDM receiver, data can be demodulated without deterioration of characteristics by ignoring the center for demodulation. Thus, it becomes possible to prevent deterioration of communication characteristics and occurrence of errors in receiving slots to avoid degradation of throughput.

(12) Also, the radio transmitter according to the present invention is characterized in that the mapping part selects a frequency of a subcarrier corresponding to a direct current potential only if subcarrier availability information notified from a communication party indicates that the frequency cannot be used for data communication.

Thus, only if subcarrier availability information notified from a communication party indicates that the frequency of a subcarrier corresponding to a direct current potential cannot be used for data communication, the subcarrier is selected, and therefore, radio transmission can be performed without causing any influence of offset by a DC component on the communication party. Accordingly, it becomes possible to prevent deterioration of communication characteristics and occurrence of errors in receiving slots to avoid degradation of throughput because the DC component will not exert any influence upon transmission and reception processing even if communication is performed with a terminal whose bandwidth in use is limited in order to reduce power consumption.

(13) Also, the radio transmitter according to the present invention is characterized in that the mapping part selects a frequency notified from a communication party.

Thus, the subcarrier of the frequency notified from a communication party is selected, and therefore, radio transmission can be performed without causing any influence of offset by a DC component on the communication party. Accordingly, it becomes possible to prevent deterioration of communication characteristics and occurrence of errors in receiving slots to avoid degradation of throughput because the DC component will not exert any influence upon transmission and reception processing even if communication is performed with a terminal whose bandwidth in use is limited in order to reduce power consumption.

(14) Also, the radio transmitter according to the present invention is characterized in that the mapping part updates a subcarrier frequency to be selected each time a communication party with which communication is performed using communication slots changes.

Thus, the subcarrier frequency to be selected is updated each time a communication party with which communication is performed changes, and therefore, processing in accordance with the communication party can be performed. Radio transmission can thereby be performed without causing any influence of offset by a DC component regardless of which bandwidth a communication party uses. Accordingly, it becomes possible to prevent deterioration of communication characteristics and occurrence of errors in receiving slots to avoid degradation of throughput because the DC component will not exert any influence upon transmission and reception processing even if communication is performed with a terminal whose bandwidth in use is limited in order to reduce power consumption.

According to the present invention, it becomes possible to prevent deterioration of communication characteristics and occurrence of errors in receiving slots to avoid degradation of throughput because the DC component will not exert any influence upon transmission and reception processing even if communication is performed with a terminal whose bandwidth in use is limited in order to reduce power consumption.

BEST MODES FOR CARRYING OUT THE INVENTION

Radio communication systems according to present embodiments will be described below. The present embodiments assume a communication system based on the above OFDMA.

The present embodiments only exemplify circuit configurations and control methods, and purposes thereof are not to modulate a subcarrier corresponding to a DC component in a radio transmitter to avoid any influence of noise of the DC component in a transmitting circuit and similarly not to demodulate the subcarrier corresponding to the DC component in a receiving circuit. Thus, there are various methods available for implementation.

First Embodiment

In a first embodiment, a terminal is shown in which, regardless of which bandwidth a terminal connected is capable of processing, no modulated data is provided to a subcarrier selected as a center frequency by the terminal. In a conventional technology, relationships between sub-channels and subcarriers are: subcarriers f(640) to f(703) allocated to F1, subcarriers f(704) to f(767) to F2, . . . , subcarriers f(960) to f(1023) to F6, subcarriers f(1) to f(64) to F7, subcarriers f(65) to f(128) to F8, . . . , and subcarriers f(321) to f(384) to F12, but here subcarriers whose subcarrier number exceeds 512 are represented by subtracting 1024. Thus, new representations will be changed to: subcarriers f(−384) to f(−321) allocated to F1, subcarriers f(−320) to f(−257) to F2, . . . , subcarriers f(−64) to f(−1) to F6, subcarriers f(1) to f(64) to F7, subcarriers f(65) to f(128) to F8, . . . , and subcarriers f(321) to f(384) to F12.

Figure 1:
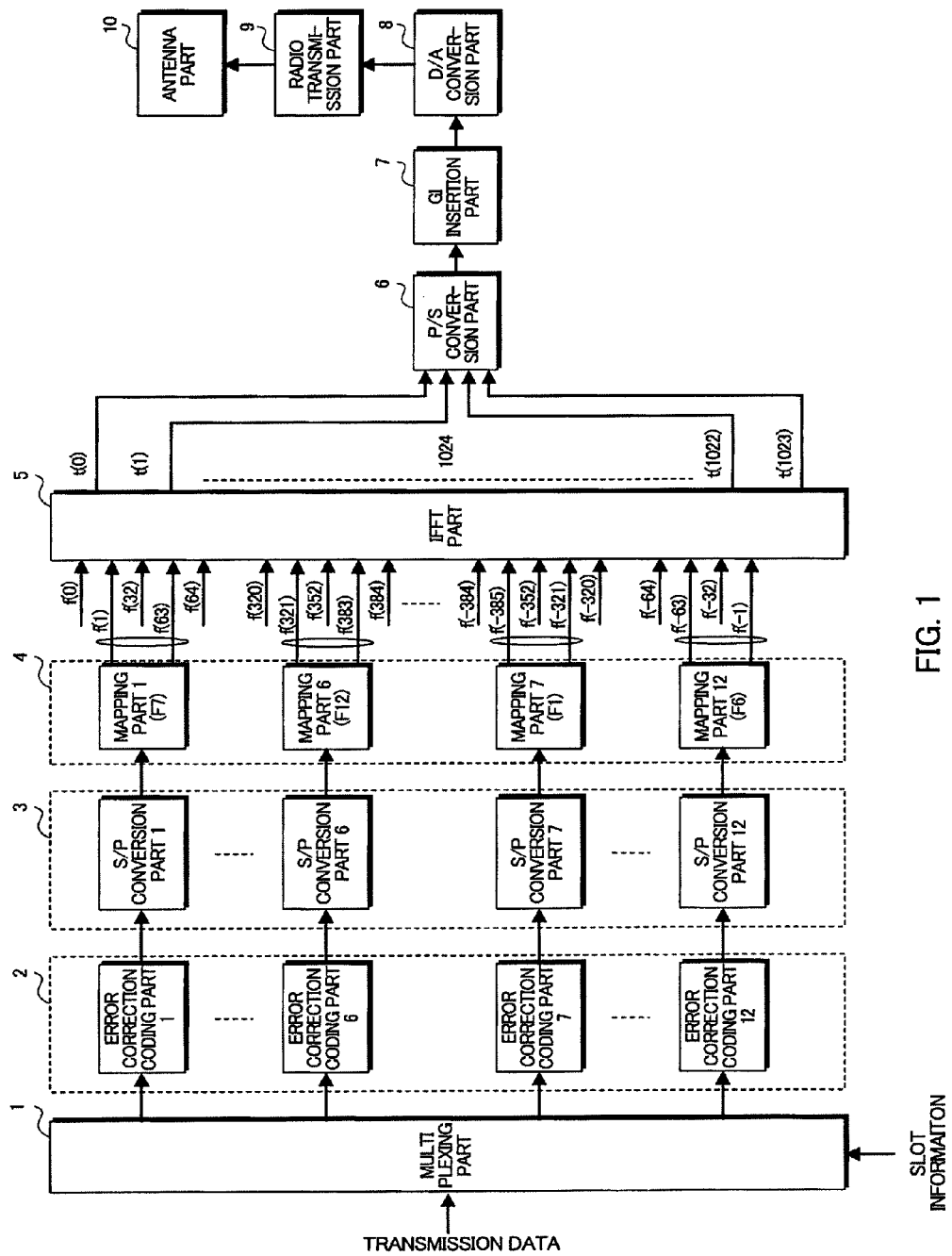
FIG. 1 is a block diagram illustrating a schematic configuration of a transmitting circuit according to a first embodiment.
Figure 6:
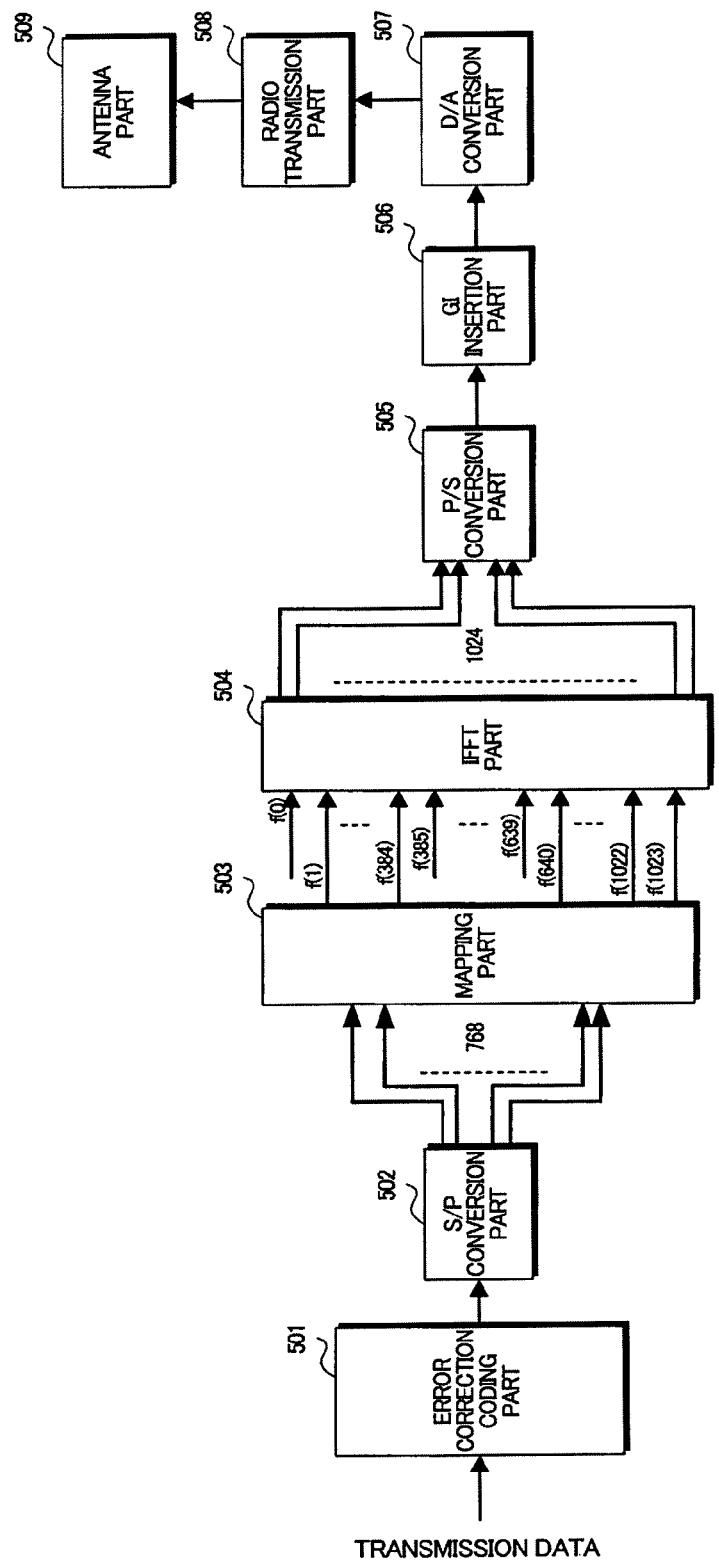
FIG. 6 is a block diagram illustrating the schematic configuration of a conventional OFDM modulation circuit.
Figure 7:
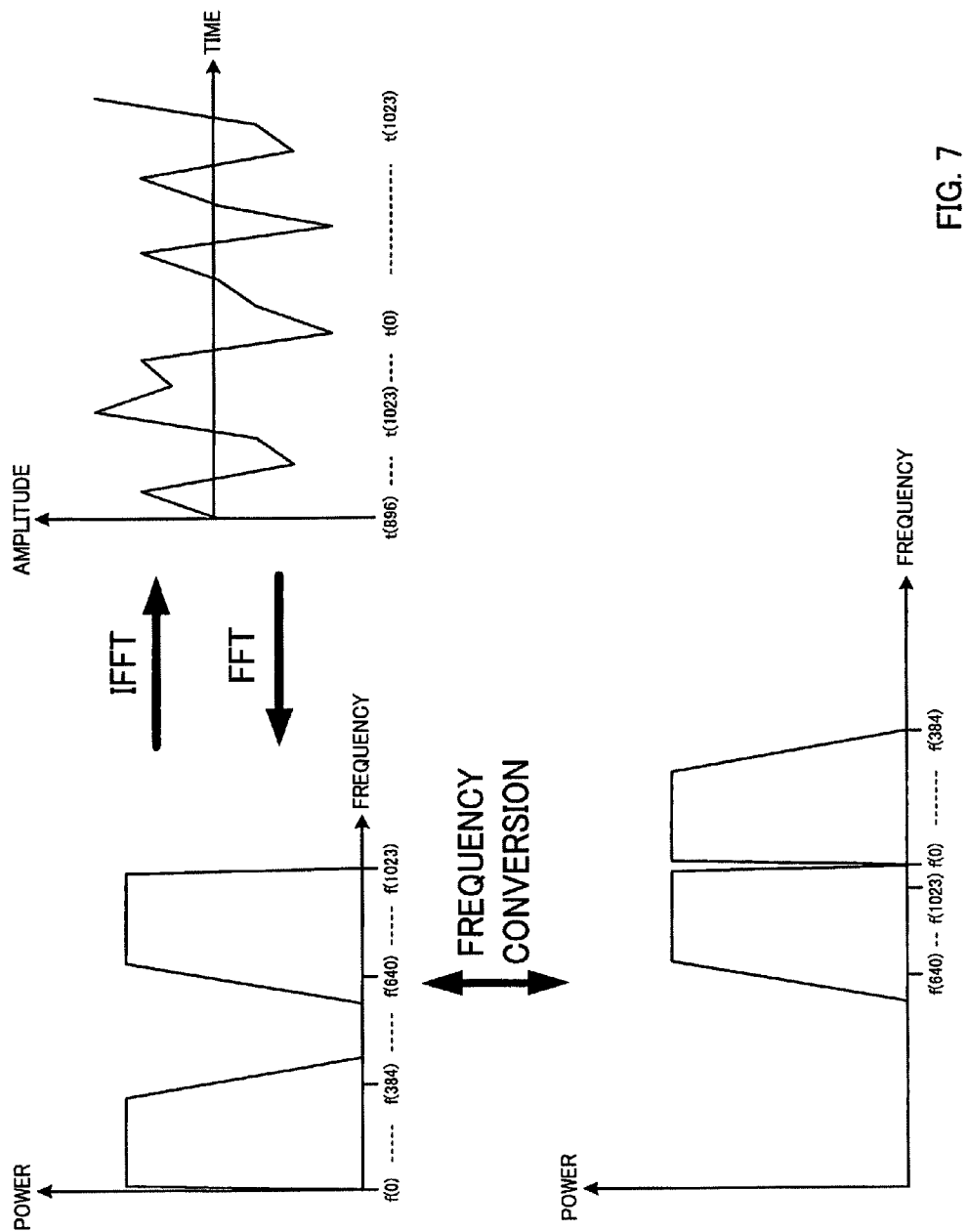
FIG. 7 illustrates a schematic view of spectrum of an OFDM signal after D/A conversion, a schematic view of time waveforms after D/A conversion, and a schematic view after frequency conversion of the spectrum to a transmission band.
Figure 8:
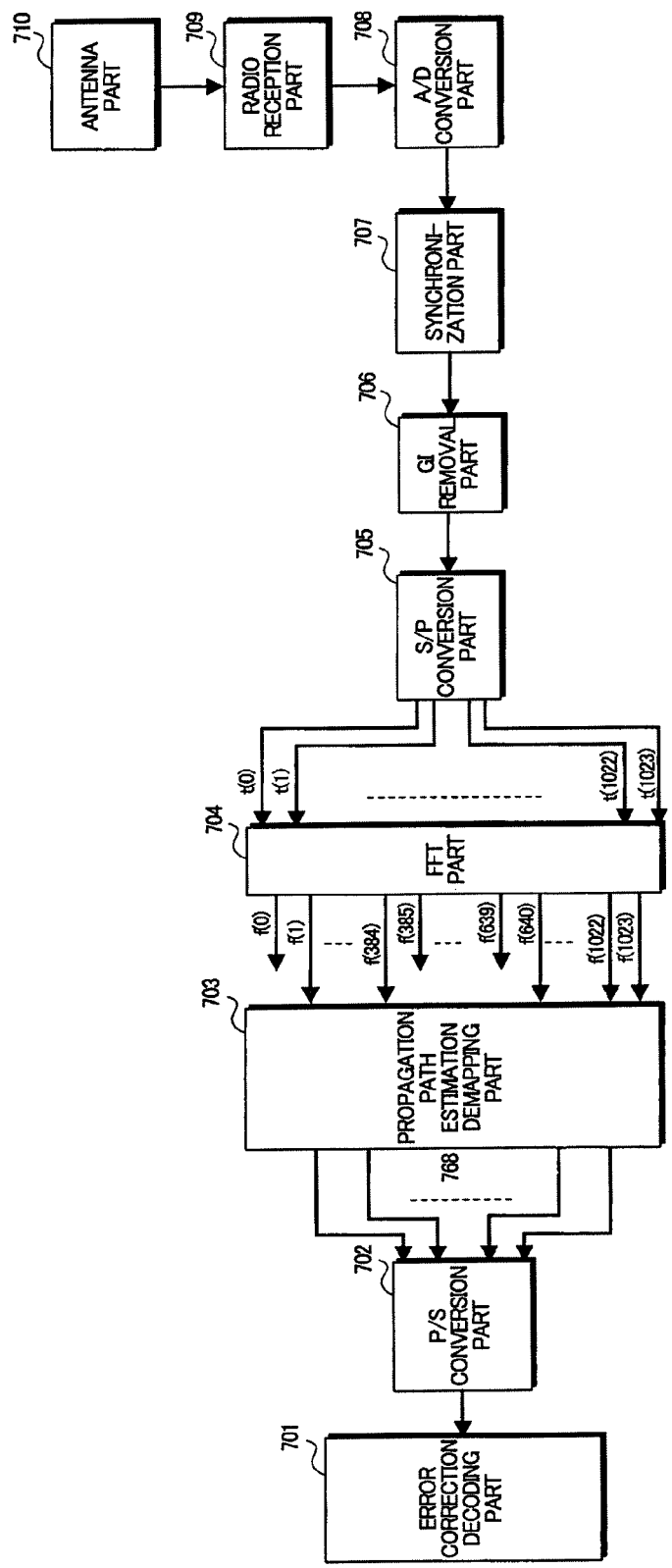
FIG. 8 is a block diagram illustrating the schematic configuration of a conventional OFDM demodulator circuit.

FIG. 1 is a block diagram illustrating a schematic configuration of a transmitting circuit according to the first embodiment. The transmitting circuit shown in FIG. 1 has a data multiplexing part 1, and is divided into an error correction coding part 2, an S/P conversion part 3, and a mapping part for the number of channels (one to twelve). An IFFT part 5, a P/S conversion part 6, a GI insertion part 7, a D/A conversion part 8, a radio transmission part 9, and an antenna part 10 fulfill functions similar to those of the IFFT part 504, parallel/serial conversion part (P/S conversion part) 505, guard interval insertion part 506, digital/analog conversion part (D/A conversion part) 507, radio transmission part 508, and antenna 509 shown in FIG. 6 respectively.

The mapping part 4 allocates transmission power to each subcarrier and also selects a subcarrier to which minimum power (for example, zero) of the transmission power to be allocated should be allocated. Then, transmission data is modulated in units of communication slots and the modulated data is output. In the mapping part 4 described above, each corresponding sub-channel number has been added and marking of f(m) has been changed to m=−512 to 511. In the conventional technology, modulation of subcarriers corresponding to the subcarrier numbers zero, 385 to 511, and −385 to −512 is not performed. In the first embodiment, in addition, modulation of subcarriers corresponding to the subcarrier numbers 32.times.p (p is an integer between −12 and 12) is not performed. Viewed from slot allocation, this means that the number of subcarriers used by each sub-channel is 62 and subcarriers in the center of each sub-channel and between sub-channels are not modulated.

A terminal that can receive only one sub-channel filters the one sub-channel to perform reception processing. Since in this case no modulation of subcarrier in the center of each sub-channel has been performed, data can be demodulated without deterioration of characteristics by ignoring the center for demodulation like a conventional OFDM receiver. Similarly, since the center frequency of a terminal that can access only x (x is an odd number equal to 12 or smaller) sub-channels will be the center of a sub-channel under the current assumption and the subcarrier thereof is not used for modulation, data can be demodulated without deterioration of characteristics by ignoring the center for demodulation like the conventional OFDM receiver.

The center of a terminal that can access only y (y is an even number equal to 12 or smaller) sub-channels will be between sub-channels. Since also a subcarrier between sub-channels is not used for modulation, similar to the conventional OFDM receiver, data can be demodulated without deterioration of characteristics by ignoring the center for demodulation.

In the first embodiment, as described above, receivers suitable for various bands can be connected without deterioration of characteristics.

Second Embodiment

In the first embodiment described above, a method was shown in which subcarriers not to be used are selected in advance to deal with various terminals. However, according to this method, the transmission rate of a highly capable terminal that can use all bands for transmission and reception may be lower than that of a conventional method. Subcarriers that cannot be used are set in the first embodiment while all 768 subcarriers can be used in the conventional method, and therefore, the number of available subcarriers is 744 and, if an identical modulation is applied to all subcarriers, the rate thereof will drop to 744/768.

Thus, in the second embodiment, a method in which subcarriers not used adaptively are set will be described.

Figure 2:
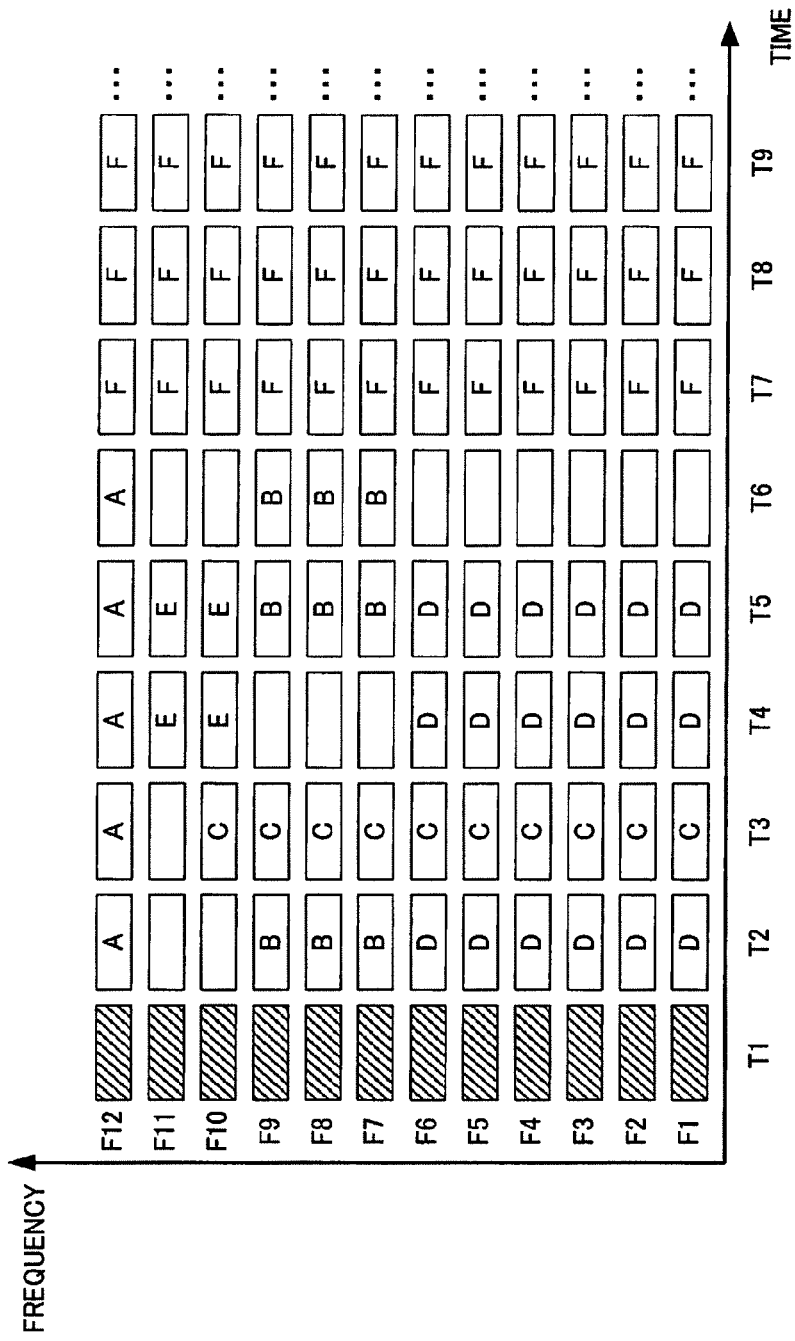
FIG. 2 is a diagram illustrating allocation of communication slots in some frame.

FIG. 2 is a diagram illustrating allocation of communication slots in some frame. Similar to the conventional technology, slots with oblique lines are broadcast slots received by all terminals and the terminals A to F perform communication using indicated slots respectively. When determining a center subcarrier position in descriptions below, processing is performed by assuming that the number of subcarriers used is odd so that the processing can be made easier to understand. However, there is no inevitability for this assumption and, if an even number of subcarriers are used for processing, the center frequency will be a frequency at which no subcarrier exists and no problem will be caused by arranging in advance which subcarrier to use as the center subcarrier between the transmitting and receiving apparatuses.

Since the control slots need to be received by all stations in FIG. 2, similar to the first embodiment, subcarriers not used for modulation are arranged. More specifically, the subcarrier numbers not used for modulation are zero, 385 to 511, −385 to −512, and 32.times.p (p is an integer between −12 and 12).

Next, focusing on A, slots to be used are five slots of (T2 to T6, F12) and the frequency channel is F12 only. f(321) to f(384) are allocated to F12 and it is assumed that the subcarrier with the maximum number f(384) and the subcarrier f(352) positioned in the center after excluding f(384) are not to be used.

Focusing on B, slots to be used are nine slots of (T2, F7 to F9) and (T5 to T6, F7 to F9). Subcarriers to be used for F7 to F9 are f(1) to f(192) and it is assumed that the subcarrier with the maximum number f(192) and the subcarrier f(96) positioned in the center after excluding f(192) are not to be used.

C uses 10 slots of (T3, F1 to F10). Subcarriers to be used are f(−384) to f(256). If subcarriers to be accessed sandwich f(0), processing not to use a subcarrier with the maximum number is not performed. Thus, only the subcarrier f(−64) positioned in the center is not to be used. f(0) is naturally not used.

D uses 18 slots of (T2, F1 to F6) and (T4 to T5, F1 to F6). Subcarriers to be used are f(−384) to F(−1). Thus, the subcarrier f(−1) with the maximum number and the subcarrier f(−193) positioned in the center are not to be used.

E uses 4 slots of (T4 to T5, F10 to F11). Subcarriers to be used are f(193) to F(320). Thus, the subcarrier f(320) with the maximum number and the subcarrier f(256) positioned in the center are not to be used.

F uses 36 slots of (T7 to T9, F1 to F12). Subcarriers to be used are f(−384) to F(384). Only the subcarrier f(0) positioned in the center is not to be used.

FIG. 3 summarizes unused subcarriers in units of time slots. As is evident from FIG. 3, the number of unused subcarriers has decreased in comparison with the first embodiment and terminals capable of accessing all bands can use exactly as many subcarriers as before. Continuous bands are allocated to slots in FIG. 2 and even if an unused slot is present therebetween, no problem will be caused by performing processing under the assumption that a band thereof is being used.

Figure 4:
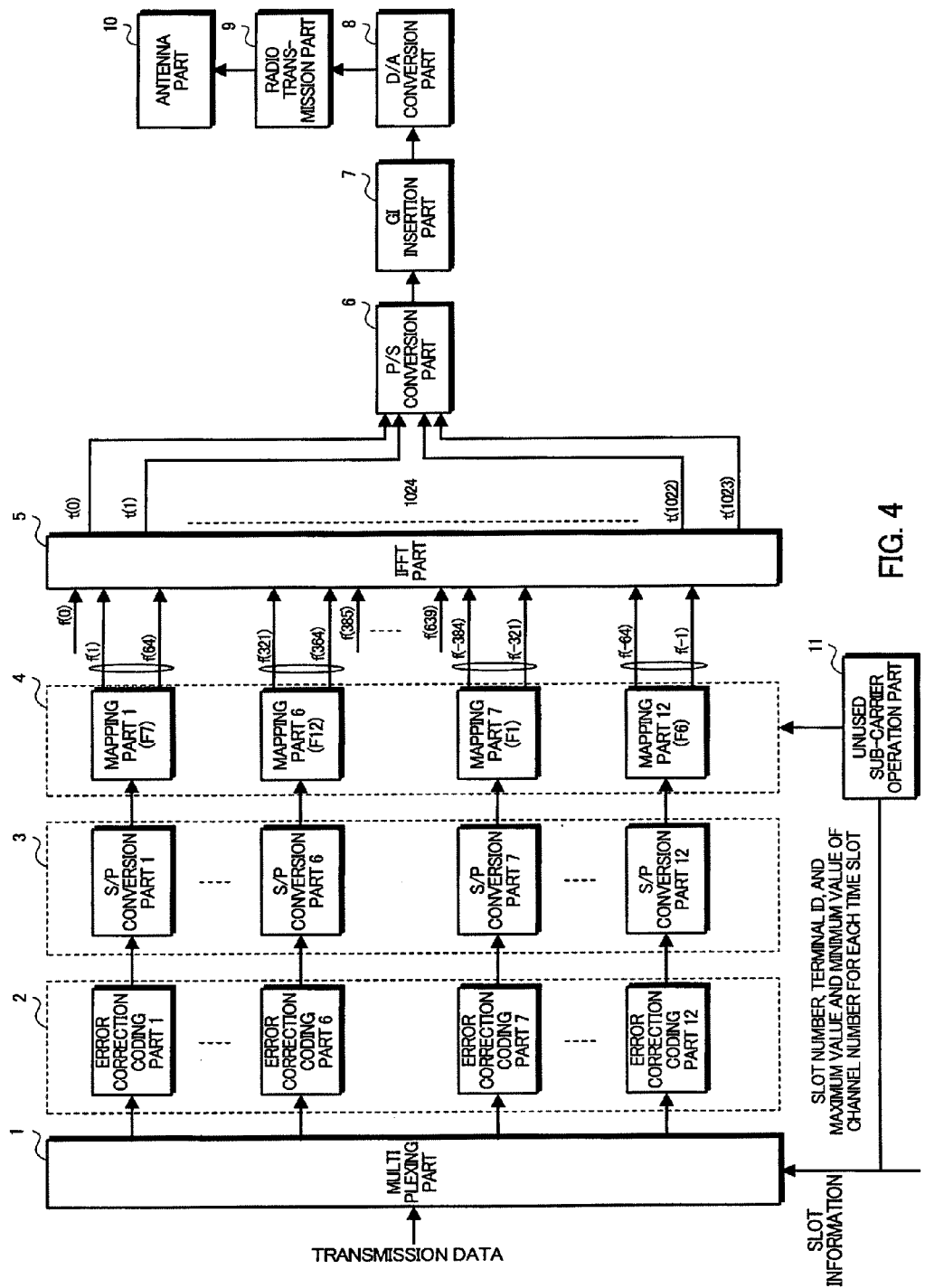
FIG. 4 is a block diagram illustrating the schematic configuration of a transmitting circuit according to a second embodiment.

FIG. 4 is a block diagram illustrating the schematic configuration of a transmitting circuit according to the second embodiment. When compared with the transmitting circuit according to the first embodiment shown in FIG. 1, the transmitting circuit according to the second embodiment additionally has the unused subcarrier operation part 11. The unused subcarrier operation part 11 carries out a function to operate unused subcarriers described above. The slot number, the terminal ID using the slot, and the maximum number and minimum number of the sub-channel number to be used are input into the unused subcarrier operation part 11.

Figure 5:
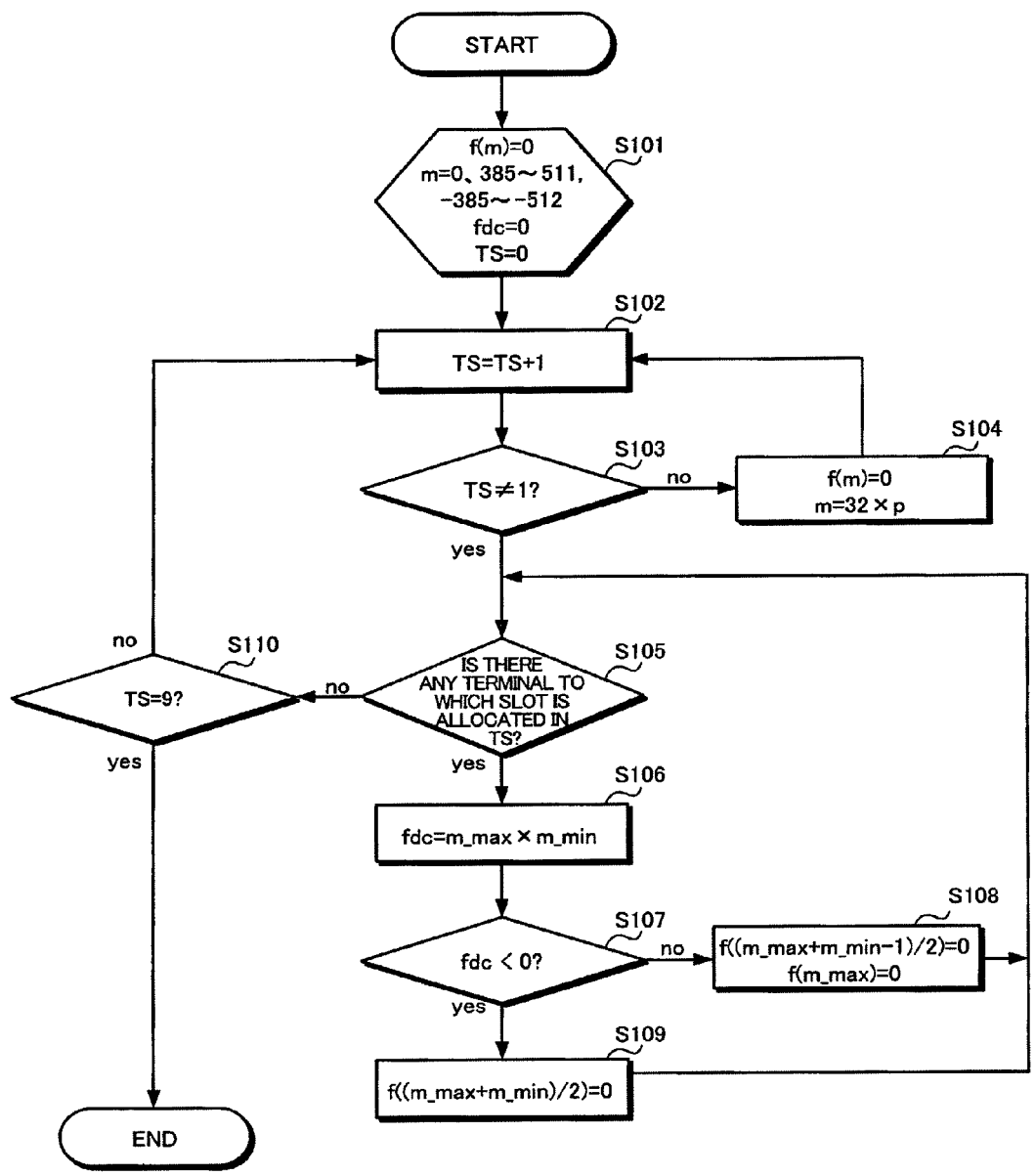
FIG. 5 is a flow chart illustrating operations of an unused subcarrier operation part 11.

FIG. 5 is a flow chart illustrating operations of the unused subcarrier operation part 11. Parameters used in FIG. 5 are the same as those described above. However, fdc is an index value showing whether or not a channel used contains a DC component, TS is a variable value of the slot number, and m_max and m_min are the maximum value and minimum value of the sub-channel to be input into the unused subcarrier operation part 11 for use respectively. An unused subcarrier is represented as f(m)=0.

When starting to configure a frame in S101, f(0), f(385 to 511), and f(−385 to −512) are set always to zero. Also, fdc=0 and TS=0 are set. In S102, TS is incremented by one. In S103, whether the current slot is a broadcast slot is determined. Since in the present embodiment broadcast information is transmitted using the T1 slot, the slot is determined to be a broadcast slot if TS=1. If the slot is a broadcast slot, f(m) with m=32.times.p (p is an integer between −12 and 12) for subcarriers not to be transmitted is set to zero in S104.

If TS is equal to or greater than 2, proceed to S105. Here, whether in applicable TS there is a terminal to which a slot should be allocated is determined. If there is such a terminal, proceed to S106, and if there is no such terminal, proceed to S110. In S106, an fdc operation is performed. fdc is an operation based on the subcarrier number. In S107, whether sub-channels are allocated by sandwiching f(0) is determined based on the value of fdc. If fdc is negative, proceed to S109 because sub-channels are allocated by sandwiching f(0). If fdc is positive, proceed to S108. S108 is a process to determine unused subcarriers when f(0) is not sandwiched and the subcarrier f(m_max) with the maximum value and the center subcarrier f((m_max+m_min−1)/2) in the band excluding f(m_max) are set to zero respectively.

S109 is a process to determine unused subcarriers when f(0) is sandwiched and the subcarrier f((m_max+m_min−1)/2) to be the center in the band is set to zero. In S110, whether slots have been allocated up to a frame end is determined. Since in the second embodiment the time slot is up to 9, whether TS=9 or not is determined. If TS=9, processing is terminated to return to an initial state.

By determining unused subcarriers according to the method described above for each frame, communication can be performed efficiently without suffering degradation of characteristics.

Unused subcarriers are determined in the first and second embodiments under the assumption that an influence of DC noise of a reception apparatus is always considerable, but existence of a terminal with very good characteristics can also be considered. Thus, the introduction of a function to determine unused subcarriers to eliminate an influence of the DC noise in the reception apparatus can also be considered when a request is made from a terminal.

That is, if notification that any subcarrier to be a DC component in all frequency channels of allocated communication slots cannot be used is received from a terminal, no modulated data is allocated to the subcarrier and therefore, it becomes possible to prevent deterioration of communication characteristics and occurrence of errors in receiving slots to avoid degradation of throughput with a communication party in which communication characteristics of a subcarrier to be a DC component are degraded. For a communication party in which communication characteristics of a subcarrier to be a DC component are not degraded, on the other hand, it becomes possible to increase utilization efficiency of frequencies by allocating modulated data also to the subcarrier to be a DC component.

Though examples in which the numbers of subcarriers of basic sub-channels are identical in all sub-channels are shown for both the first and second embodiments, these are only basic examples and can also be applied easily when the numbers of subcarriers are different in different sub-channels.

Incidentally, base station equipment can be configured by a transmitting circuit according to the present embodiments. With this base station equipment, it becomes possible to prevent deterioration of communication characteristics and occurrence of errors in receiving slots to avoid degradation of throughput because the DC component will not exert any influence upon transmission and reception processing even if communication is performed with a terminal whose bandwidth in use is limited in order to reduce power consumption.

EXPLANATION OF NUMERALS

1: data multiplexing part
2: error correction coding part
3: S/P conversion part
4: mapping part
5: IFFT part
6: P/S conversion part
7: guard interval (GI) insertion part 8: D/A conversion part
9: radio transmission part
10: antenna part
11: unused subcarrier operation part

What is claimed:

1. A transmitting apparatus operable in a wireless communication system, comprising:
   a receiving circuit configured for receiving an indication of a usable bandwidth of a receiving apparatus based on a communication from the receiving apparatus;
   a transmitting circuit configured for constructing and transmitting an orthogonal frequency division multiplexing (OFDM) signal having a plurality of subcarriers allocated among one or more frequency channels comprising all or a part of a frequency band used by the transmitting circuit for transmitting signals, wherein the one or more frequency channels correspond to the usable bandwidth of the receiving apparatus, and wherein the transmitting circuit receives an indication of the usable bandwidth based on a communication from the receiving apparatus; and
   signal processing components configured to allocate data to be received by the receiving apparatus to a plurality of used subcarriers within a data portion of the OFDM signal, but not to a plurality of unused subcarriers within the data portion;
   wherein the OFDM signal further comprises a broadcast portion carrying broadcast information;
   wherein the broadcast information comprises an indirect indication of the positions of the unused subcarriers within the data portion of the OFDM signal, whereby the positions of the unused subcarriers within the data portion are mutually known between the transmitting apparatus and the receiving apparatus in relation to the indirect indication; and
   wherein the unused subcarriers are determined based on the usable bandwidth of the receiving apparatus.

2. The transmitting apparatus according to claim 1 wherein the unused subcarriers include at least one subcarrier positioned at a center of the data portion of the OFDM signal.

3. The transmitting apparatus according to claim 1 wherein the indirect indication comprises an identification of the one or more frequency channels used for transmission of the data portion of the OFDM signal.

4. The transmitting apparatus according to claim 1 wherein each of the one or more frequency channels comprises 64 subcarriers.

5. The transmitting apparatus according to claim 1 wherein the OFDM signal further comprises a broadcast portion in which broadcast information is allocated to each of a second plurality of used subcarriers, but not to a second plurality of unused subcarriers;
   wherein the second plurality of unused subcarriers within the broadcast portion of the OFDM signal includes at least one subcarrier positioned at a center of each of the one or more frequency channels within the broadcast portion of the OFDM signal; and
   wherein the plurality of unused subcarriers within the data portion of the OFDM signal includes at least one subcarrier positioned at a center of the data portion.

6. The transmitting apparatus according to claim 5 wherein the broadcast information comprises an indirect indication of the positions of the unused subcarriers within the data portion of the OFDM signal.

7. The transmitting apparatus according to claim 6 wherein the indirect indication comprises an identification of the one or more frequency channels used for transmission of the data portion of the OFDM signal.

8. The transmitting apparatus according to claim 1 wherein the transmitting circuit is further configured to convert digital signals representing the plurality of subcarriers to analog signals and to convert the analog signals to radio frequency signals according to a center frequency of the usable bandwidth.

9. A method for constructing and transmitting orthogonal frequency division multiplexing (OFDM) signals in a wireless communication system, the method comprising:
   determining, by a transmitting apparatus, a usable bandwidth of a receiving apparatus based on a communication between the transmitting apparatus and the receiving apparatus;
   constructing an OFDM signal having a plurality of subcarriers allocated among one or more frequency channels comprising all or a part of a frequency band used by the transmitting apparatus for transmitting signals, wherein the one or more frequency channels correspond to the usable bandwidth of the receiving device;
   wherein constructing the OFDM signal comprises allocating transmission data to be received by the receiving apparatus to each of a plurality of used subcarriers within the data portion of the OFDM signal, but not to a plurality of unused subcarriers within the data portion;
   wherein the OFDM signal further comprises a broadcast portion carrying broadcast information,
   wherein the broadcast information comprises an indirect indication of the positions of the unused subcarriers within the data portion of the OFDM signal, whereby the positions of the unused subcarriers within the data portion are mutually known between the transmitting apparatus and the receiving apparatus in relation to the indirect indication;
   wherein the unused subcarriers are determined based on the usable bandwidth of the receiving apparatus; and
   transmitting the OFDM signal for reception by the receiving apparatus.

10. The method according to claim 9 wherein the unused subcarriers within the data portion of the OFDM signal include at least one subcarrier positioned at a center of the data portion.

11. The method according to claim 9 wherein the indirect indication comprises an identification of the one or more frequency channels used for transmission of the data portion of the OFDM signal.

12. The method according to claim 9 wherein each of the one or more frequency channels comprises 64 subcarriers.

13. The method according to claim 9 wherein the OFDM signal further comprises a broadcast portion in which broadcast information is allocated to each of a second plurality of used subcarriers, but not to a second plurality of unused subcarriers;
   wherein the second plurality of unused subcarriers within the broadcast portion of the OFDM signal includes at least one subcarrier positioned at a center of each of the one or more frequency channels within the broadcast portion; and
   wherein the plurality of unused subcarriers within the data portion of the OFDM signal includes at least one subcarrier positioned at a center of the data portion.

14. The method according to claim 13, wherein the broadcast information comprises an indirect indication of the positions of the unused subcarriers within the data portion of the OFDM signal.

15. The method according to claim 14 wherein the indirect indication comprises an identification of the one or more frequency channels used for transmission of the data portion of the OFDM signal.

16. The method according to claim 9 further comprising receiving a notification of the usable bandwidth of the receiving apparatus.

17. The method according to claim 9 wherein constructing the OFDM signal further comprises:
converting digital signals representing the plurality of subcarriers to analog signals; and
converting the analog signals to radio frequency signals according to a center frequency of the usable bandwidth.

18. A transmitting apparatus operable in a wireless communication system, comprising:
a transmitting circuit for constructing and transmitting an orthogonal frequency division multiplexing (OFDM) signal having a plurality of subcarriers allocated among one or more frequency channels comprising all or a part of a frequency band used by the transmitting circuit for transmitting signals, wherein the one or more frequency channels correspond to a usable bandwidth of a receiving apparatus, wherein the transmitting circuit receives an indication of the usable bandwidth based on a communication from the receiving apparatus, and wherein each of the one or more frequency channels comprises 64 subcarriers; and
signal processing components configured to allocate transmission data to be received by the receiving apparatus to each of a first plurality of used subcarriers within a data portion of the OFDM signal, but not to a first plurality of unused subcarriers within the data portion, wherein the first plurality of unused subcarriers within the data portion are determined based on the usable bandwidth of the receiving apparatus and wherein the unused subcarriers include one or more subcarriers positioned at a center of the data portion;
wherein the signal processing components are further configured to allocate broadcast information to each of a second plurality of used subcarriers within a broadcast portion of the OFDM signal, but not to a second plurality of unused subcarriers within the broadcast portion, wherein the second plurality of unused subcarriers within the broadcast portion includes one or more subcarriers positioned at a center of each of the one or more frequency channels within the broadcast portion;
wherein the broadcast information comprises an indirect indication of the positions of the first plurality of unused subcarriers within the data portion of the OFDM signal; and
a receiving circuit for receiving information indicative of the usable bandwidth of the receiving apparatus.

19. The transmitting apparatus according to claim 18 wherein the indirect indication comprises an identification of the one or more frequency channels used for transmission of the data portion of the OFDM signal.

20. The transmitting apparatus according to claim 18 wherein the transmitting circuit is further configured to convert digital signals representing the plurality of subcarriers to analog signals and to convert the analog signals to radio frequency signals according to a center frequency of the usable bandwidth.

21. A method for constructing and transmitting orthogonal frequency division multiplexing (OFDM) signals in a wireless communication system, the method comprising:
determining, by a transmitting apparatus, a usable bandwidth of a receiving apparatus based on a communication between the transmitting apparatus and the receiving apparatus;
constructing an OFDM signal having a plurality of subcarriers allocated among a plurality of frequency channels comprising all or a part of a frequency band used by the transmitting apparatus for transmitting signals, wherein the one or more frequency channels correspond to the usable bandwidth of the receiving apparatus, and wherein each of the one or more frequency channels comprises 64 subcarriers;
wherein constructing the OFDM signal comprises allocating transmission data to be received by the receiving apparatus to each of a first plurality of used subcarriers within a data portion of the OFDM signal, but not to a first plurality of unused subcarriers within the data portion, wherein the first plurality of unused subcarriers within the data portion are determined based on the usable bandwidth of the receiving apparatus and wherein the first plurality of unused subcarriers includes one or more subcarriers positioned at a center of the data portion;
wherein constructing the OFDM signal further comprises allocating broadcast information to each of a second plurality of used subcarriers within a broadcast portion of the OFDM signal, but not to a second plurality of unused subcarriers within the broadcast portion, wherein the second plurality of unused subcarriers includes one or more subcarriers positioned at a center of each of the one or more frequency channels within the broadcast portion;
wherein the broadcast information comprises an indirect indication of the positions of the first plurality of unused subcarriers within the data portion of the OFDM signal; and
transmitting the OFDM signal for reception by the receiving apparatus.

22. The method according to claim 21 further comprising the step of receiving a notification of the usable bandwidth of the receiving apparatus.

23. The method according to claim 21 wherein the indirect indication comprises an identification of the one or more frequency channels used for transmission of the data portion of the OFDM signal.

24. The method according to claim 21 wherein constructing the OFDM signal further comprises:
converting digital signals representing the plurality of subcarriers to analog signals; and
converting the analog signals to radio frequency signals according to a center frequency of the usable bandwidth.

25. A transmitting apparatus operable in a wireless communication system, comprising:
a receiving circuit configured for receiving an indication of a usable bandwidth of a receiving apparatus based on a communication from the receiving apparatus;
a transmitting circuit configured for constructing and transmitting an orthogonal frequency division multiplexing (OFDM) signal having a plurality of subcarriers allocated among one or more frequency channels comprising all or a part of a frequency band used by the transmitting circuit for transmitting signals, wherein the one or more frequency channels correspond to the usable bandwidth of the receiving apparatus, and wherein the transmitting circuit receives an indication of the usable bandwidth based on a communication from the receiving apparatus; and signal processing components configured to allocate data to be received by the receiving apparatus to a plurality of used subcarriers within a data portion of the OFDM signal, but not to a plurality of unused subcarriers within the data portion;

wherein the unused subcarriers are determined based on the usable bandwidth of the receiving apparatus;

wherein the OFDM signal further comprises a broadcast portion in which broadcast information is allocated to each of a second plurality of used subcarriers, but not to a second plurality of unused subcarriers;

wherein the second plurality of unused subcarriers within the broadcast portion of the OFDM signal includes at least one subcarrier positioned at a center of each of the one or more frequency channels within the broadcast portion of the OFDM signal; and wherein the plurality of unused subcarriers within the data portion of the OFDM signal includes at least one subcarrier positioned at a center of the data portion.

26. The transmitting apparatus according to claim 25, wherein the broadcast information comprises an indirect indication of the positions of the unused subcarriers within the data portion of the OFDM signal.

27. The transmitting apparatus according to claim 26, wherein the indirect indication comprises an identification of the one or more frequency channels used for transmission of the data portion of the OFDM signal.

28. The transmitting apparatus according to claim 25, wherein the transmitting circuit is further configured to convert digital signals representing the plurality of subcarriers to analog signals and to convert the analog signals to radio frequency signals according to a center frequency of the usable bandwidth.

29. The transmitting apparatus according to claim 25, wherein each of the one or more frequency channels comprises 64 subcarriers.

30. A method for constructing and transmitting orthogonal frequency division multiplexing (OFDM) signals in a wireless communication system, the method comprising:

determining, by a transmitting apparatus, a usable bandwidth of a receiving apparatus based on a communication between the transmitting apparatus and the receiving apparatus;

constructing an OFDM signal having a plurality of subcarriers allocated among one or more frequency channels comprising all or a part of a frequency band used by the transmitting apparatus for transmitting signals, wherein the one or more frequency channels correspond to the usable bandwidth of the receiving device;

wherein constructing the OFDM signal comprises allocating transmission data to be received by the receiving apparatus to each of a plurality of used subcarriers within the data portion of the OFDM signal, but not to a plurality of unused subcarriers within the data portion;

wherein the unused subcarriers are determined based on the usable bandwidth of the receiving apparatus;

wherein the OFDM signal further comprises a broadcast portion in which broadcast information is allocated to each of a second plurality of used subcarriers, but not to a second plurality of unused subcarriers;

wherein the second plurality of unused subcarriers within the broadcast portion of the OFDM signal includes at least one subcarrier positioned at a center of each of the one or more frequency channels within the broadcast portion; and wherein the plurality of unused subcarriers within the data portion of the OFDM signal includes at least one subcarrier positioned at a center of the data portion; and transmitting the OFDM signal for reception by the receiving apparatus.

31. The method according to claim 30, wherein the broadcast information comprises an indirect indication of the positions of the unused subcarriers within the data portion of the OFDM signal.

32. The method according to claim 31, wherein the indirect indication comprises an identification of the one or more frequency channels used for transmission of the data portion of the OFDM signal.

33. The method according to claim 30, further comprising receiving a notification of the usable bandwidth of the receiving apparatus.

34. The method according to claim 30, wherein constructing the OFDM signal further comprises:

converting digital signals representing the plurality of subcarriers to analog signals; and converting the analog signals to radio frequency signals according to a center frequency of the usable bandwidth.

35. The method according to claim 30, wherein each of the one or more frequency channels comprises 64 subcarriers.

* * * * *